United States Patent
Kosuri et al.

(10) Patent No.: US 8,741,031 B2
(45) Date of Patent: *Jun. 3, 2014

(54) HOLLOW CERAMIC FIBERS, PRECURSORS FOR MANUFACTURE THEREOF UTILIZING PORE FORMERS, METHODS OF MAKING THE SAME, AND METHODS OF USING THE SAME

(75) Inventors: Madhava R. Kosuri, Newark, DE (US); Dean W. Kratzer, Warwick, MD (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 324 days.

This patent is subject to a terminal disclaimer.

(21) Appl. No.: 13/194,995

(22) Filed: Jul. 31, 2011

(65) Prior Publication Data
US 2013/0025459 A1    Jan. 31, 2013

(51) Int. Cl.
B01D 53/22 (2006.01)
B01D 69/08 (2006.01)
B01D 69/10 (2006.01)
B29C 47/06 (2006.01)

(52) U.S. Cl.
USPC .......... 96/10; 96/8; 96/11; 95/54; 95/55; 264/42; 264/44; 264/45.9; 264/122; 264/632; 264/634

(58) Field of Classification Search
USPC ......... 96/8, 10, 11; 95/45, 54, 55; 264/42, 43, 264/44, 45.9, 109, 122, 171.12, 632, 634
See application file for complete search history.

(56) References Cited

U.S. PATENT DOCUMENTS

| | | | |
|---|---|---|---|
| 3,458,615 A | 7/1969 | Bragaw et al. | |
| 4,493,629 A | 1/1985 | Goffe | |
| 5,799,960 A | 9/1998 | Davis, Sr. | |
| 2006/0127656 A1* | 6/2006 | Gallo et al. | 428/212 |
| 2009/0169884 A1 | 7/2009 | Ekiner et al. | |
| 2010/0018394 A1 | 1/2010 | Ekiner et al. | |

FOREIGN PATENT DOCUMENTS

| | | |
|---|---|---|
| CN | 101284215 | 10/2008 |
| GB | 830 441 | 6/1956 |

OTHER PUBLICATIONS

Othman, Mohd et al., "Single-step fabrication and characterisations of electrolyte/anode dual-layer hollow fibres for micro-tubular solid oxide fuel cells", Feb. 2010, Journal of Membrane Science, vol. 351, pp. 196-204.*
International Search Report for PCT/US2012/048954, mailed Oct. 10, 2012.

(Continued)

Primary Examiner — Jason M Greene
(74) Attorney, Agent, or Firm — Christopher J. Cronin

(57) ABSTRACT

A composite hollow ceramic fiber includes a porous hollow core supporting a thin, dense sheath. The non-gas-tight core comprises a first ceramic material and an interconnecting network of pores. The gas-tight sheath comprises a second ceramic material. The fiber is made by extruding core and sheath suspensions from a spinnerette. The core suspension includes particles of the first ceramic material, a polymeric binder, a solvent, and a pore former material insoluble in the solvent. The sheath suspension includes particles of the second ceramic material, a polymeric binder and a solvent. The nascent hollow fiber is coagulated in a coagulant bath to effect phase inversion of the polymeric binders. The resultant green fiber is sintered in a two step process. First, the binders and pore former material are burned off. Second, the sheath is densified and the second ceramic material is sintered without fully sintering the core.

23 Claims, 6 Drawing Sheets

(56) References Cited

OTHER PUBLICATIONS

Othman, et al.; "Single-Step Fabrication and Characterisations of Electrolyte/Anode Dual-Layer Hollow Fibres for Micro-Tubular Solid Oxide Fuel Cells"; Journal of Membrane Science, Elsevier Scientific Publ. Company, Amsterdam, NL, vol. 351, No. 1-2; Apr. 1, 2010; pp. 196-204; XP026937438; ISSN: 0376-7388.

Wu, et al., "A Dense Oxygen Separation Membrane Deriving from Nanosized Mixed Conducting Oxide," Journal of Membrane Science 291 (2007) 172-179.

Kratzer, et al., "Composite Hollow Ceramic Fibers, Precursors for, Methods of Making the Same, and Methods of Using the Same," U.S. Appl. No. 13/174,682, filed Jun. 30, 2011.

Li, et al., "Hollow Ceramic Fibers, Precursors for Manufacture Thereof Utilizing Nanoparticles, Methods of Making the Same, and Methods of Using the Same," U.S. Appl. No. 13/194,990, filed Jul. 31, 2011.

* cited by examiner

HOLLOW CERAMIC FIBERS, PRECURSORS FOR MANUFACTURE THEREOF UTILIZING PORE FORMERS, METHODS OF MAKING THE SAME, AND METHODS OF USING THE SAME

CROSS-REFERENCE TO RELATED APPLICATIONS

None.

BACKGROUND

The use of membranes for separation of mixtures of liquids and gases is well-developed and commercially very important art. Such membranes are traditionally composed of a homogeneous, usually polymeric composition through which the components to be separated from the mixture are able to travel at different rates under a given set of driving force conditions, e.g. trans-membrane pressure and concentration gradients. Examples are the desalination of water by reverse osmosis, separation of water/ethanol mixtures by pervaporation, separation of hydrogen from refinery and petrochemical process streams, enrichment of oxygen or nitrogen from air, and removal of carbon dioxide from natural gas streams. In each separation, the membranes must withstand the conditions of the application, and must provide adequate flux and selectivity to be economically attractive.

One type of membrane that may be used to separate oxygen from non-oxygen gases or hydrogen from non-hydrogen gases is made of a solid electrolyte material. A solid electrolyte is an inorganic crystalline material that, while being impermeable to gases, has the property of conducting oxygen ions ($O^{2-}$) or protons ($H^+$) through vacancies in its crystalline structure. In order to maintain electric charge neutrality, certain solid electrolyte membranes must include a separate electron-conductive path. Other solid electrolyte membranes are made of materials that, at elevated temperatures, can simultaneously conduct oxygen ions and electrons or simultaneously conduct protons and electrons. Examples of these oxygen ion conductive materials include certain perovskites such as $La_xSr_{1-x}CoO_{3-y}$, $La_xSr_{1-x}FeO_{3-y}$, and $La_xSr_{1-x}Fe_yCo_{1-y}O_{3-z}$ are examples of mixed conductors. One example of a proton conductive material is a cermet, a composite of metal and sintered ceramic. Other examples of proton conductive materials include the single-phase mixed metal oxide materials of the formula: $AB_{1-x}B'_xO_{3-y}$, wherein A is selected from Ca, Sr or Ba ions, B is selected from Ce, Zr, Ti, Tb, Pr, or Th ions, B' is selected from Yb, In, Ru, Nd, Sc, Y, Eu, Ca, La, Sm, Ho, Tm, Gd, Er, Zr, Gb, Rh, Ti, V, Cr, Mn, Fe, Co, Ni, Cu, Al, Ga, or In ions (or combinations thereof), x is greater than or equal to 0.02 and less than or equal to 0.5, and y is such that the electrical neutrality of the crystal lattice is preserved. These oxygen ion or proton conductive membranes are often called mixed oxide conducting membranes.

Other terms used to describe these membranes include mixed ion and electron(ic) conducting membranes, mixed proton and electron(ic) conducting membranes, ion transport membranes, oxygen transport membranes, hydrogen transport membranes, solid state membranes, mixed conducting metallic oxide, and mixed conducting multicomponent metallic oxide membranes. Regardless of the name utilized, these materials have the ability to transport oxygen ions ($O^{2-}$) or protons ($H^+$) through their crystalline structure.

Using oxygen conductive mixed oxide conducting membranes as an example, at elevated temperatures, the mixed oxide conducting material contains mobile oxygen ion vacancies that provide conduction sites for transport of oxygen ions through the material. The membrane is in part driven by a difference in oxygen partial pressure across the membrane. When the surface of the membrane is exposed to the relatively higher $O_2$ partial pressure gaseous atmosphere, the molecular oxygen in the gaseous atmosphere adjacent the surface reacts with electrons and the oxygen vacancies in the crystalline structure of the material to product oxygen ions $O^{2-}$. The oxygen anions diffuse through the mixed conductor material to the opposite surface of the membrane which is exposed to the relatively lower $O_2$ partial pressure. At the opposite surface, the oxygen anions give up their electrons and form molecular oxygen. The molecular oxygen then diffuses into the gaseous atmosphere adjacent the surface of the membrane exposed to the lower $O_2$ partial pressure gaseous atmosphere. These materials transport oxygen ions selectively, and assuming a defect-free membrane and lack of interconnecting pores, they can act as a membrane with an infinite selectivity for oxygen.

Proton conductive mixed oxide conducting membranes operate in much the same way and are similarly in part driven by a difference in hydrogen partial pressure across the membrane. When the surface of the membrane is exposed to the relatively higher $H_2$ partial pressure gaseous atmosphere, hydrogen molecules disassociate into protons and electrons which migrate through the membrane to the opposite surface where they recombine into hydrogen molecules. The thus-formed hydrogen molecules then diffuse into the gaseous atmosphere adjacent the membrane surface. Similar to oxygen conducting mixed oxide conducting membranes, these proton conducting membranes offer the possibility of infinite selectivity for hydrogen.

Mixed oxide conducting membranes have been successfully made in flat or planar shapes and large cylindrical tubes (with outer diameters of greater than 1 cm), but have had limited commercial success because of their relatively low surface area compared to small-diameter (for example, an outer diameter/inner diameter of 670/490 microns) hollow fibers.

Large cylindrical tubes may be distinguished from small-diameter hollow fibers not only on the basis of size, but also in their manner of manufacture. Larger diameter tubes are typically made by extrusion through a die of, or cast from, a composition having a very high solids content and very low solvent/dispersant content. This is done in order to provide the rigidity necessary for such structures to avoid collapse after being extruded or being removed from the cast.

As an example of small-diameter hollow fibers, US 20090169884 discloses that they may be made by injection of a relatively high solvent content suspension (e.g. 10-33% or even 20-25% by weight of the suspension) through an annulus of a hollow fiber spinnerette and injection of a bore fluid from a bore on the inside of the spinnerette annulus. Preferred polymers are copolymers having both soft and hard segments. The nascent fiber is passed through a short air gap and directly into a coagulating fluid to facilitate phase change of the polymeric binder in the suspension. The coagulated fiber exhibits excellent processability and may be drawn and wound on a take-up roll, drum, spool, or bobbin.

During the production of mixed oxide conducting membranes, the unsintered, or "green", plate, tube, or fiber is subjected to a heat treatment to pyrolize the binder and sinter the ceramic material to yield a dense, monolithic structure of very low porosity. These fibers are variously described as non-porous or micro-porous. The degree of porosity may vary from across one surface of the membrane to the other, but the pores do not interconnect.

Mixed oxide conducting membranes can be placed in two major groups: those that conduct oxygen ions and those that conduct protons. Membranes from the first group may be used to separate oxygen from gas mixtures containing oxygen. Membranes from the first group may also be used to produce oxygen for reaction with a feedstock, for example, light hydrocarbons such as methane, natural gas, or ethane. Membranes from the second group are typically used to separate hydrogen from gas mixtures containing hydrogen, such as syngas. Regardless of whether they conduct oxygen ions or protons, mixed oxide conducting membranes appear to be well suited for oxygen or hydrogen production or separations since they can be operated in a pressure driven mode. Thus, production of oxygen (or production of the reaction product of oxygen and light feedstock) or hydrogen is driven by the difference in the partial pressure of the gas of interest between the two sides of the membrane.

Mixed oxide conducting membranes must exhibit a variety of mechanical and physical properties in order to withstand handling during processing into gas separation modules and also provide a desirable operational lifetime while maintaining a suitable level of performance under operating conditions. More particularly, they should have sufficient strength to resist cracking during formation of the eventual gas separation module from the component fibers. Fibers of especially small diameters are especially susceptible to breaking during handling. They should also be capable of withstanding elevated pressure differentials and elevated oxygen, hydrogen, carbon monoxide, carbon dioxide, moisture, or other chemical conditions without significant loss in its oxygen ion or proton transport ability. However, mixed oxide conducting materials exhibit different degrees of these mechanical and physical properties. For example, many mixed oxide conducting materials exhibit excessive creep at elevated temperature which may cause the membrane to deform and ultimately crack under certain pressures.

Permeation of oxygen across a mixed oxide conducting membrane may be modeled upon the Wagner theory:

$$J_{O2} = \frac{RT}{4tn^2F^2} \frac{\sigma_e \sigma_l}{\sigma_e + \sigma_l} Ln(P_{1,O2}/P_{2,O2})$$

Since $\sigma_e >> \sigma_l$, $\frac{\sigma_e \sigma_l}{\sigma_e + \sigma_l} = \sigma_l$ $$J_{O2} = \frac{\sigma_l RT}{4tn^2F^2} Ln(P_{1,O2}/P_{2,O2})$$

$$\propto \frac{\sigma_l T}{t} Ln(P_{1,O2}/P_{2,O2})$$

where $J_{O2}$ is the oxygen flux defined as flow rate per unit area, $\sigma_e$ and $\sigma_l$ are intrinsic electronic and ionic conductivity of the material, R is the ideal gas constant, T is the absolute temperature, t is the membrane thickness, n is the charge on the charge carrier (which in the case of oxygen ions is 2), F is Faraday's constant, $P_{1,O2}$ is the oxygen partial pressure at the feed side and $P_{2,O2}$ is the oxygen partial pressure on the permeate side. The permeation of hydrogen across a mixed oxide conducting membrane may be derived from the above equations with appropriate substitution of n and the partial pressures of hydrogen on the opposite sides of the membrane.

As seen in the above derivation, flux is directly proportional to ion conductivity, operating temperature and pressure ratio while it is inversely proportional to membrane thickness. Thus thinner films could lead to higher oxygen fluxes, reduced surface areas, lower operating temperatures, and smaller oxygen partial pressure differentials across the mixed conductor material.

Although mixed oxide conducting membranes present the possibility for infinite selectivity, there is a tradeoff between flux and mechanical strength. As the thickness of the mixed oxide conducting material is decreased, the mechanical strength correspondingly decreases. Because a mixed oxide conducting membrane must possess a minimum amount of strength to withstand manufacture, handling, and operation (especially in reactive environments), there is a limit to how much the thickness may be decreased. On the other hand, as the thickness is increased in order to provide the necessary mechanical strength, flux suffers.

Wu, et al. fabricated densified oxygen separation membranes from nano size $SrCo_{0.4}Fe_{0.5}Zr_{0.1}O_{3-\delta}$ (SCFZ) powders synthesized via a flame aerosol synthesis (FAS) method and densified oxygen separation membranes from SCFZ powders synthesized by the traditional solid-state reaction (SSR) method. Z. Wu, X. Dong, W. Jin, Y. Fan, N. Xu, "*A Dense Oxygen Separation Membrane Deriving From Nano-sized Mixed Conducting Oxide*", Journal of Membrane Science 291 (2007) 172-179. This was done by uniaxially pressing the powders separately into 16 mm disks followed by sintering and polishing to a desired thickness. The crystal structure, morphology, oxygen desorption property and oxygen non-stoichiometry of the monolithic membranes were characterized. Compared with SCFZ synthesized by the SSR method, the densification temperature of SCFZ membranes was reduced and the oxygen permeation flux was increased by 40% at the elevated temperatures (1,073-1,223° K) when SCFZ-FAS powders were used as the starting material. However, because the membranes were produced by polishing sintered disks made from uniaxially pressed FAS powder, a relative great thickness (0.8 mm) resulted.

The thickness of the separation layer thickness can be reduced by increasing the porosity asymmetry of a monolithic fiber. In all-polymeric fibers hollow fibers, a desired degree of asymmetry across the thickness of the fiber wall can be adjusted in a complex manner by varying the content of the bore fluid, the content of the coagulant, the solvent content of the dope formulation, and the residence time of the nascent fiber in the coagulation bath. The degree to which this technique is effective is based upon the baseline asymmetry. However, this approach is limited in application to hollow fibers made of a matrix of polymer and ceramic particles. This is because such composite fibers have a baseline degree of porosity asymmetry that is relatively lower than that of all-polymer fibers due to their lower solvent content. Thus, it is difficult to control the thickness of the densified layer. As a result, the thickness (and resultant overall flux) of the separation layer is difficult to precisely controlled.

The thickness of the separation layer can also be reduced by using a two-layered composite fiber produced by the spin dope technique such as that disclosed in U.S. patent application Ser. No. 13/174,682 filed on Jun. 30, 2011. In that method, the spinnerette is modified to form a thin sheath and a thick core. A core has an interconnecting network of pores while the sheath is gas-tight. These differing morphologies are produced by using a first ceramic compound with a higher melting point in the core and a second ceramic compound with a lower melting point in the sheath. The composite fiber is sintered under conditions sufficient to densify the sheath while retaining the interconnecting network of pores in the core. However, this approach requires the ceramic compound in the core dope to have a higher melting point than that in the sheath dope.

The thickness of the separation layer can also be reduced by using a two-layered composite fiber produced by the spin dope technique such as that disclosed in U.S. patent application Ser. No. 13/194,990, entitled "HOLLOW CERAMIC FIBERS, PRECURSORS FOR MANUFACTURE THEREOF UTILIZING NANOPARTICLES, METHODS OF MAKING THE SAME, AND METHODS OF USING THE SAME", and filed concurrently herewith. In that method, the spinnerette continuously extrudes a thin sheath and a thick core. The nascent fiber is coagulated, dried, and sintered. The resultant core has an interconnecting network of pores while the sheath is gas-tight. These differing morphologies are produced by using a relatively small particle size ceramic material in the unsintered sheath as compared to the ceramic material of the core. The relatively small particle size depresses the melting temperature of the ceramic material of the sheath (as compared to the material in bulk form). This allows the sheath to be sintered and densified to gas-tightness while the core is not fully sintered and remains porous and non-gas-tight. However, this approach requires the ceramic material in the sheath dope to have a smaller particle size than that of ceramic material the core dope.

Thus, it is an object of the invention to provide a solid state electrolyte membrane that exhibits both satisfactory flux and mechanical strength. It is a further object of the invention to provide greater control over the thickness of the separation layer. It is a still further object of the invention to provide greater freedom in selecting the ceramic compound for use in the separation layer without regard to melting temperature differences or particle size differences.

SUMMARY

There is disclosed a process for making a composite hollow fiber, that comprises the following steps. A core suspension is prepared comprising a first polymeric binder, a first particulate ceramic material, a first solvent, and a pore former material. A sheath suspension is prepared comprising a second polymeric binder, a second particulate ceramic material, and a second solvent. A spinnerette is provided that is adapted and configured to continuously extrude one or more nascent hollow fibers comprising a hollow core formed from the core suspension and a sheath surrounding the core formed from the sheath suspension. The nascent hollow fiber is immersed in a liquid coagulant to facilitate phase inversion of the first and second polymeric binders. The coagulated fiber is withdrawn from the liquid coagulant. The pore former material is not present in the sheath suspension. The pore former material is insoluble in the first and second solvents. The second particulate ceramic material comprises a mixed oxide conductor. The first and second particulate ceramic materials are chemically identical or different. The first and second solvents are the same or different. The first and second polymeric binders are the same or different.

There is also disclosed a composite hollow fiber produced by the above-described process.

There is also described a method of making a composite hollow ceramic fiber that comprises the following steps. The above-described composite hollow fiber is heated under conditions sufficient to drive off the first and second polymeric binders. The binderless composite hollow fiber is heated under conditions sufficient to sinter the core and sheath and densify the sheath to gas-tightness but not fully sinter the core.

There is also disclosed a composite hollow ceramic fiber produced by the above-described method.

- the pore former material has a median particle size of no greater than 20% of a wall thickness of the coagulated fiber.
- the pore former has a median particle size no less than 150% of a median particle size of the first ceramic material.
- the first and second particulate ceramic materials are chemically identical.
- the first suspension further comprises an amount of the second particulate ceramic material.
- the second suspension further comprises an amount of the first particulate ceramic material.
- the first suspension further comprises an amount of the second particulate ceramic material; and
- the second suspension further comprises an amount of the first particulate ceramic material.
- the nascent hollow fiber is passed from the spinnerette through an air gap.
- the mixed oxide conductor comprises a hydrogen conducting mixed oxide conductor.
- the mixed oxide conductor is an oxygen conducting mixed oxide conductor.
- the oxygen conducting mixed oxide conductor is a perovskite independently selected from formula (I):

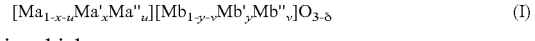

$[Ma_{1-x-u}Ma'_xMa''_u][Mb_{1-y-v}Mb'_yMb''_v]O_{3-\delta}$     (I)

in which:
Ma represents an atom chosen from scandium, yttrium, or from the families of lanthanides, actinides or alkaline-earth metals;
Ma', which is different from Ma, represents an atom chosen from scandium, yttrium or from the families of lanthanides, actinides or alkaline-earth metals;
Ma", which is different from Ma and Ma', represents an atom chosen from aluminum (Al), gallium (Ga), indium (In), thallium (Tl) or from the family of alkaline-earth metals;
Mb represents an atom chosen from transition metals;
Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);
$0<x\leq0.5$;
$0\leq u\leq0.5$;
$(x+u)\leq0.5$;
$0\leq y\leq0.9$;
$0\leq v\leq0.9$;
$0\leq(y+v)\leq0.9$; and
w is such that the structure in question is electrically neutral.

- the second particulate ceramic material is $La_{1-x}Sr_xFe_{1-y}Co_yO_{3-\delta}$.
- the second particulate ceramic material is $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$.
- the pore former has a median particle size of 5 to 50 μm.
- the composite hollow fiber has an outer diameter of 150-6,000 μm, an inner diameter of 50-2,000 μm, a core thickness of 50-2,000 μm, and a sheath thickness of 3-70 μm.

the composite hollow fiber has an outer diameter of 1,300-2,850 µm and a combined core and sheath thickness of 260-1,000 µm.

the pore former is present in the core suspension in an amount comprising 20-60 vol. % out of the total amount of solids in the core suspension.

an outside diameter of the composite hollow ceramic fiber is in a range from about 900 to 2,000 µm and a ratio of the outside diameter of the composite hollow ceramic fiber to an inside diameter of the composite hollow ceramic fiber is in a range of from about 1.20:1.0 to about 3.0:1.0 the core has an interconnecting network of pores.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
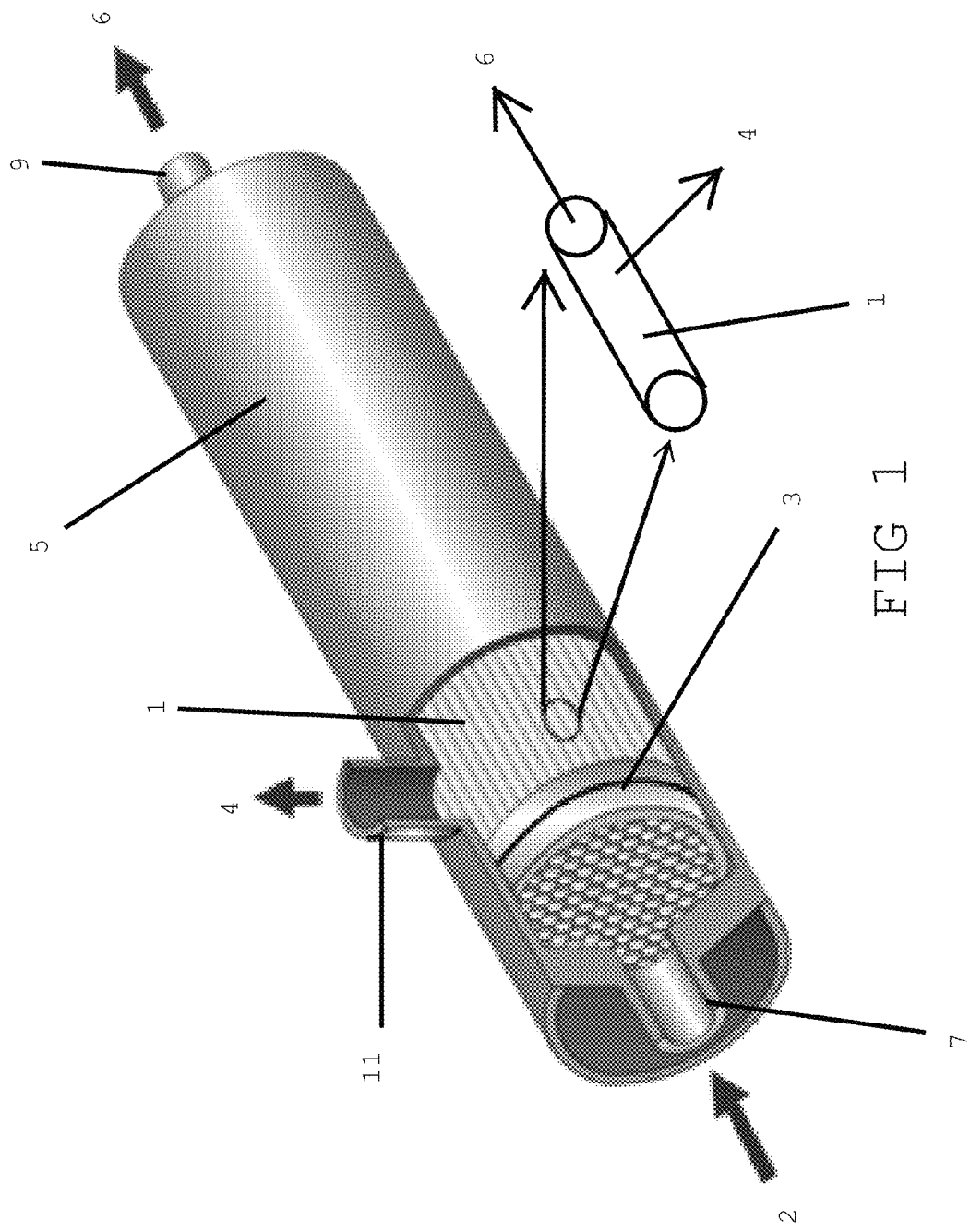
FIG. 1 is a schematic of a gas separation module utilizing the composite hollow fibers of the present invention.

The composite hollow ceramic fiber of the present invention includes a sheath portion surrounding a hollow core portion. A bore extends axially through the core portion.

The core portion has an interconnecting network of pores and is not gas-tight. It is made up of a first ceramic material and optional additional ceramic materials. The relatively high porosity of the core portion allows relatively high flux between the outer and inner surfaces of the core portion without a significant decrease in the differential partial pressure driving force.

In contrast, the sheath portion is dense and relatively non-porous and is gas-tight. While the sheath is typically fully densified and void-free, it may have a relatively low degree of porosity yet still remain gas-tight. It is made up of a second ceramic material which is a mixed oxide conducting material and optional additional ceramic materials. Because it is a mixed oxide conducting material, at elevated temperatures, the second ceramic material has the property of conducting oxygen ions or protons between its surfaces based upon the difference in partial pressures of the gas of interest between the two membrane sides. Due to the gas-tightness of the sheath and the oxygen ion or proton conducting properties of the second ceramic material, the sheath provides a gas separation layer of near-infinite, if not infinite, selectivity.

The core and sheath work in tandem to provide a sufficiently high flux of oxygen or hydrogen across the membrane.

The presence of the interconnecting network of pores in the core allows molecular oxygen or molecular hydrogen to flow through the network of pores. Due to this mechanism, the core should not present much resistance to the flow of oxygen or hydrogen. Acting as the support for the sheath, the core is formed with a thickness sufficient to provide a mechanical strength suitable for withstanding processing and operation.

While the sheath may contain a certain degree of porosity, the pores do not interconnect to establish an open path through which molecular oxygen or hydrogen may flow. Thus, the sheath is gas-tight. Because the flux of oxygen or hydrogen across the membrane is highly dependent upon the thickness of the sheath, a relatively thin sheath is formed on the core.

Typically, the composite hollow ceramic fiber has an outer diameter of 105-4,200 µm, and inner diameter of 35-1,400 µm, a core thickness of 35-1,400 µm, and a sheath thickness of 2-50 µm.

Because the core is not gas-tight and the sheath is, the relatively small sheath thickness can yield impressive improvements in flux compared to conventional monolithic hollow ceramic fibers without sacrificing fiber strength. US 20100018394 discloses the preparation of monolithic hollow ceramic fibers having an outer diameter of 670 µm and an inner diameter of 490 µm, to yield a wall thickness of 180 µm. One may recall the equation described above that is derived from the model based upon the Wagner theory where flux is inversely proportional to the thickness (t) of the membrane $$J_{O2} = \frac{\sigma_I RT}{4tn^2 F^2} Ln(P_{1,O2}/P_{2,O2})$$

$$\propto \frac{\sigma_I T}{t} Ln(P_{1,O2}/P_{2,O2})$$

Again, the same relationship for hydrogen may be establish with appropriate substitution of n and the partial pressures of hydrogen.

With insertion of constants for $\sigma_I$, T, $P_{1,O2}$, and $P_{2,O2}$, the flux is proportional to $1/t$ or $1/180$ µm. In contrast, because the core of the inventive fiber is not gas-tight, the flux of the inventive fiber is proportional to $\frac{1}{2}$-50 µm. Even with a conservatively estimated sheath thickness of 40-50 µm, this represents a 360% to 450% theoretical increase in flux for the inventive fiber in comparison to the conventional fiber of US 20100018394. Because the overall wall thickness of the inventive fiber (core thickness plus sheath thickness) is comparable to that of the conventional fiber, the strength of the inventive fiber is not significantly impacted.

More typically, the composite hollow ceramic fiber has an outer diameter of 1,000-2,000 µm and a combined core and sheath thickness of 200-700 µm. A ratio of the outside-diameter of the composite hollow ceramic fiber to the inside-diameter is in a range of from about 1.20:1.0 to about 3.0:1.0.

Thus, the combination of the relatively thicker, porous, and non-gas-tight core and the thin, dense, gas-tight sheath allows a sufficiently high level of flux without sacrificing mechanical strength. This feature of the invention provides a decided advantage over conventional monolithic hollow fiber membranes made of mixed oxide conducting ceramics that do not exhibit such a significant morphological difference between layers. In order to match the flux of the oxygen or hydrogen across the membrane of the invention, the wall thickness of such monolithic fibers (formed from, for example, the second ceramic material) would need to be reduced to such a small level that the resultant fiber might no longer have the requisite strength to resist breaking or cracking during processing or operation. On the other hand, if such hypothetical monolithic fibers were formed with a wall thickness having the requisite strength, the flux of the oxygen or nitrogen across such a membrane would be undesirably low in comparison to the inventive fiber.

The different morphologies of the core and sheath (interconnecting network of pores in the core and dense, gas-tight layer of the sheath) may be produced by a two-step process.

First, green (unsintered) composite hollow fiber (made of a matrix of ceramics and binder) is heated under conditions sufficient high to drive off or pyrolize the binder and pore former present but not substantially sinter the core or the sheath. One of ordinary skill in the art will recognize that at least some sintering of the core and sheath occurs at the temperature(s) at which the binder and pore formers are burned off. Otherwise, the particles of the core and sheath would not cohere and the fiber would disintegrate. The burning off of the binder creates a certain degree of porosity in the sheath. On the other hand, the addition of the pore former to the core creates porosity in the core of a much higher degree and having a much large pore size. So, in comparison to the porosity of the sheath, the porosity in the core is greater in both frequency and size. After this first step, the pores in the core are interconnected and the pores in the sheath are interconnected so that neither the sheath nor the core is gas-tight.

Second, the binderless green fiber is heated under conditions sufficient to sinter the core and sheath. Because the pores in the sheath are so less numerous and are of much smaller size, the pores collapse during the second step to yield a nearly void-free sheath. On the other hand, because the pores in the core are so numerous and are of such a large size, the pores in the core substantially withstand collapse. One of ordinary skill in the art will recognize that fibers of the invention may experience some degree of core pore collapse but not total pore collapse as is experienced in the sheath. Thus, while the core may experience some densification, it is very limited in comparison to that of the sheath. As a result, the pores in the core still interconnect to provide a non-gas-tight core after the second step is performed.

Formation of the Hollow Ceramic Fibers

Typically, the hollow ceramic fibers of the present invention are made according to the following steps. A core suspension is prepared that includes a ceramic material in particulate form, a polymeric binder, a solvent for the polymeric binder, a pore former, and optionally one or more additives such as a dispersing agent. A sheath suspension is also prepared that includes the same or different ceramic material in particulate form, a polymeric binder, a solvent for the polymeric binder, no pore former, and optionally one or more additives such as a dispersing agent. The core and sheath suspensions are continuously extruded as nascent hollow fibers from a spinnerette.

Numerous spinnerette assemblies have been devised for the production of multi-component hollow fibers of the sheath/core type. Particularly, devices have been proposed for ensuring uniform supply of homogeneous fiber-forming liquid suspension to the orifices of a spinnerette with the object of producing hollow fibers of identical dimensions. Still other devices have been proposed for supplying homogeneous core-forming liquid suspension and sheath-forming liquid suspension to the spinnerette—this time with the object of producing hollow composite fibers of identical dimensions. These spinnerettes use a means for supplying the bore fluid positioned in the spinning orifice for forming the hollow fiber. Usually, a tube is used for this purpose and a bore fluid is injected from the tube into the bore of the fiber being formed to maintain the shape of the fiber until the polymeric materials making up the fiber are coagulated or solidified. Typical spinnerette assemblies are described by UK 830,441, U.S. Pat. Nos. 3,458,615, 4,493,629, and 5,799,960, the contents of which are incorporated herein in their entirety.

Regardless of the particular spinnerette used, the sheath suspension is extruded as a thin annulus from a circumferential portion of the spinnerette die to form the nascent sheath. The core suspension is extruded as a thick annulus within the thin annulus of the extruded sheath suspension and surrounding the tube from which bore fluid is injected. Bore fluid injected through this tube forms a continuous fluid stream within the bore of the nascent core. The bore fluid is preferably water, but a mixture of water and an organic solvent (for example NMP) may be used as well.

Typical spinning and downstream processing techniques are disclosed by US 2010/0018394 A1, the contents of which are incorporated herein in their entirety.

The nascent hollow fiber is passed from the spinnerette through an air gap and then immersed in a liquid coagulant to facilitate phase inversion. The fiber is then withdrawn from the coagulant and typically wound onto a take-up roll. The wound fiber may then be washed to remove residual solvent. Finally, the washed fiber may be dried to remove volatile material.

Typically, the dried, unsintered composite hollow fiber has an outer diameter of 150-6,000 µm, and inner diameter of 50-2,000 µm, a core thickness of 50-2,000 µm, and a sheath thickness of 3-70 µm. More typically, the dried, unsintered composite hollow fiber has an outer diameter of 1,300-2,850 µm and a combined core and sheath thickness of 260-1,000 µm.

Polymeric Binders

Suitable types of binders for use in the core and sheath suspensions include any of the polymers used in the art of hollow fiber-based gas separation membranes. The binder of the core suspension may be the same as or different from the binder of the sheath suspension. Often, the binders are the same. Typically, the polymeric binders are glassy polymers. Especially typical binders are those disclosed in US 20100018394, the disclosure of which is incorporated herein in its entirety. The binders of US 201000018394 include certain soft-segment/hard-segment copolymers. A "soft segment" is defined as any monomer that can be used to synthesize a homopolymer exhibiting a glass transition temperature, $T_g$-soft, in the range from −60 to +10° C. wherein such homopolymers would act as elastomers at temperatures above $T_g$-soft. A "hard segment" is defined as any monomer that can be used to synthesize a homopolymer exhibiting a glass transition temperature, $T_g$-hard, above +40° C., wherein such homopolymers would act as a hard glassy material below $T_g$-hard. The percentage by weight of soft-segments present in the copolymer is preferably in the range of 50-95%, and most preferably in the range of 60-90%.

A non-limiting list of the soft-segment/hard-segment copolymers includes: poly(ether)urethane-block-polyurethane block copolymers, poly(ether)urethane-block-polyurea block copolymers, poly(ester)urethane-block-polyurethane block copolymers, and poly(ester)urethane-block-polyurea block copolymers. One of ordinary skill in the art will recognize that a block copolymer consists of two or more chemically distinct macromolecular portions (i.e., blocks) joined together to form a single macromolecule.

The following commercially available block copolymers suitable as the polymeric binder include the following: Lycra L-162 from DuPont, Elastollan 1180A from BASF, Estane 5714 from Noveon, Estane 5708 from Noveon. Another suitable polymeric binder is polyethersulfone (PESf) preferably dissolved in 1-methyl-2-pyrrolidinone (NMP) or dimethyl-sulfoxide (DMSO) and optionally including a surfactant dispersant and/or poly(vinylpyrrolidone) (PVP).

Solvents

The solvents for use in the core and sheath suspensions are used for dissolving the respective binder. While different solvents may be used in the two suspensions, typically they are the same. The solvent in question should readily dissolve the respective binder, should provide a stable suspension of the ceramic particles, and should be compatible with the overall fiber spinning process. Solvents such as N-methylpyrrolidone (NMP), N,N-dimethylacetamide (DMAC), N,N-dimethylformamide (DMF), dimethyl sulfoxide (DMSO), gamma-butyrolactone (BLO) and glycol ethers or esters are particularly useful with the polymers of this invention.

Pore Formers

The pore formers are insoluble in the solvent. The pore formers may be selected from any type of pore former known in the art of ceramic membranes or ceramic fibers that is insoluble in the solvent. A non-limiting list of particular pore formers usable with the invention include: starch, graphite, polyethylene, polypropylene, polyaramides, polytetrafluoroethylene, polystyrene, cellulose fibers, coconut shell fibers, starch, and polymethacrylmethacrylate. Particular examples of commercially available pore formers include: polyethylene particles available under the trade name Mipelon PM-200 available from Mitsui Chemicals; micronized polypropylene waxes available under the trade name PROPYLTEX™ 270S or PROPYLTEX™ 325S from MicroPowders, Inc.; polyamides available under the trade name ORGASOL™ from Elf Atochem); cellulose fibers available under the trade name ARBOCEL™ BE600-10 from Rettenmeier; standard corn starch, SP standard wheat starch, or potato starch from Roquette Frères; and rice starch available under the trade name REMYRISE™ DR Rémy. Typically, the pore formers are polymeric materials. These polymeric materials typically are burned off later at temperatures higher than that of the binder. Thus, they form pores closer in time to the sheath densification and thus are more likely to withstand pore collapse in comparison to the binder polymers that are driven off earlier in the heat treatment process and which may collapse prior to sheath densification. A typical example of a polymeric pore former is polyethylene. During burn-off, the pore formers create voids of a sufficiently large size to withstand collapse.

If the particle size of the pore former is too small, the pores created during burn-off of the polymeric binder and pore former may be too small to withstand collapse during sintering of the ceramic material. The pore formers should be at least 150% the size of the ceramic particles in the core. For example, if the ceramic particles in the core have a median size of 1 µm, the pore formers should at a minimum have a median size of 1.5 µm. If the particle size of the pore former is too large, they may result in an unsatisfactory reduction in the strength of the sintered fiber. The pore formers should have a particle size no greater than 20% of the wall thickness of the green fiber. For example, if the fiber wall thickness is 300 µm, then the pore former should have a particle size distribution such that 90% of the pore former particles should be no greater than 60 µm.

If the pore former content of the solids in the core suspension is too low, not enough pores will be formed to form and maintain an interconnecting network of pores during the two-step heat treatment process of the green fiber. Conversely, if the pore former content of the solids in the core suspension is too high, the fiber may not have sufficient integrity to avoid disintegration during and after the burn-off of the polymeric binder and pore former. Typically, the pore former content should be from about 20-60% vol/vol of total amount of ceramic particles and pore former in the core suspension.

Ceramic Compounds—Types

The ceramic material in the core suspension may be any ceramic compound known in the ceramic fiber or ceramic membrane art. While this ceramic material may also be an oxygen ion or proton mixed oxide conducting compound, it is not necessary to the invention. Typically, this ceramic material is the same one used in the sheath suspension or is chemically similar to or compatible with the one used in the sheath suspension in order to maintain adhesion between the core and sheath during formation of the green fiber and to reduce the risk of delamination of the sheath from the core during sintering of the green fiber.

The ceramic material in the second suspension may be any one of a wide variety of mixed oxide conducting materials that are known in the art as having the property of conducting oxygen or protons at elevated temperatures. These materials also conduct electrons so as to establish electronic charge neutrality.

When the hollow composite ceramic fibers are intended for the separation of oxygen from an oxygen-containing gas or for facilitating an oxidative reaction such as partial oxidation of light hydrocarbons such as methane, any one of a wide variety of oxygen-conducting mixed oxide oxygen ion conducting ceramics known in the art may be used in practice of the invention. A non-limiting list of typical ceramics suitable for use in the invention includes perovskites of formula (I):

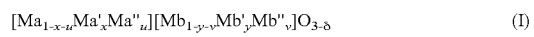

$$[Ma_{1-x-u}Ma'_xMa''_u][Mb_{1-y-v}Mb'_yMb''_v]O_{3-\delta} \quad (I)$$

in which:

Ma represents an atom chosen from scandium, yttrium, or from the families of lanthanides, actinides or alkaline-earth metals;

Ma', which is different from Ma, represents an atom chosen from scandium, yttrium or from the families of lanthanides, actinides or alkaline-earth metals;

Ma", which is different from Ma and Ma', represents an atom chosen from aluminum (Al), gallium (Ga), indium (In), thallium (Tl) or from the family of alkaline-earth metals;

Mb represents an atom chosen from transition metals;

Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);

Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);

$0 < x \leq 0.5$;

$0 \leq u \leq 0.5$;

$(x+u) \leq 0.5$;

$0 \leq y \leq 0.9$;

$0 \leq v \leq 0.9$;

$0 \leq (y+v) \leq 0.9$; and $\delta$ is such that the structure in question is electrically neutral.

The ceramic material is more particularly chosen from compounds of formula (I) in which u is equal to zero or else from compounds of formula (I) in which u is different from zero or else from compounds of formula (I) in which the sum (y+v) is equal to zero or else from compounds of formula (I) in which the sum (y+v) is different from zero.

As a typical example of formula (I) as defined above, Ma is more particularly chosen from La, Ce, Y, Gd, Mg, Ca, Sr and Ba. In this case, the ceramic material is preferably a compound of formula (Ia):

$$La_{(1-x-u)}Ma'_xMa''_uMb_{(1-y-v)}Mb'_yMb''_vO_{3-\delta} \quad (Ia),$$

in which Ma represents a lanthanum atom.

In formula (I) as defined above, Ma' is more particularly chosen from La, Ce, Y, Gd, Mg, Ca, Sr and Ba. In this case, the ceramic material is preferably a compound of formula (Ib):

$$Ma_{(1-x-u)}Sr_xMa''_uMb_{(1-y-v)}Mb'_yMb''_vO_{3-\delta} \quad (Ib),$$

in which Ma' represents a strontium atom.

As another typical example of formula (I) as defined above, Mb is more particularly chosen from Fe, Cr, Mn, Co, Ni and Ti. In this case, the second ceramic compound is preferably a compound of formula (Ic):

$$Ma_{(1-x-u)}Ma'_xMa''_uFe_{(1-y-v)}Mb'_yMb''_vO_{3-\delta} \quad (Ic),$$

in which Mb represents an iron atom.

In formula (I) as defined above, Mb' is more particularly chosen from Co, Ni, Ti and Ga while Mb" is more particularly chosen from Ti and Ga.

The ceramic material may also be a compound of formula (Id):

$$La_{(1-x)}Sr_xFe_{(1-v)}Mb''_vO_{3-\delta} \quad (Id),$$

corresponding to formula (II) in which u=0, y=0, Mb represents an iron atom, Ma represents a lanthanum atom and Ma' represents a strontium atom. In formula (II) as defined above, Ma" is more particularly chosen from Ba, Ca, Al and Ga.

The ceramic material may also be a compound of formula: $La_{(1-x-u)}Sr_xAl_uFe_{(1-v)}Ti_vO_{3-\delta}$; $La_{(1-x-u)}Sr_xAl_uFe_{(1-v)}Ga_vO_{3-\delta}$; $La_{(1-x)}Sr_xFe_{(1-v)}Ti_vO_{3-\delta}$; $La_{(1-x)}Sr_xTi_{(1-v)}Fe_vO_{3-\delta}$; $La_{(1-x)}Sr_xFe_{(1-v)}Ga_vO_{3-\delta}$ or $La_{(1-x)}Sr_xFeO_{3-\delta}$, where $La_{0.8}Sr_{0.2}Fe_{0.1}O_{3-\delta}$, $La_{0.7}Sr_{0.3}Fe_{0.8}Co_{0.2}O_{3-\delta}$, $La_{0.6}Sr_{0.4}Fe_{0.8}Co_{0.2}O_{3-\delta}$, $La_{0.6}Sr_{0.4}Fe_{0.9}Ga_{0.1}O_{3-\delta}$, $La_{0.8}Sr_{0.2}Fe_{0.7}Ga_{0.3}O_{3-\delta}$, or $La_{0.5}Sr_{0.5}Fe_{0.9}Ti_{0.1}O_{3-\delta}$ are most typical.

Another example of a ceramic material with a crystal structure of the perovskite type of formula (I) include those of formula (I'):

$$Ma^{(a)}_{(1-x-u)}Ma'^{(a-1)}_xM''^{(a'')}_uMb^{(b)}_{(1-s-y-v)}Mb^{(b+1)}_s Mb''^{(b+\beta)}_yMb''^{(b'')}_vO_{3-\delta} \quad (I'),$$

in which:
a, a–1, a", b, (b+1), (b+β) and b" are integers representing the respective valences of the Ma, Ma', Ma", Mb, Mb' and Mb" atoms; and a, a", b, b", β, x, y, s, u, v and δ are such that the electrical neutrality of the crystal lattice is preserved;
a>1;
a", b and b" are greater than zero;
−2≤β≤2;
a+b=6;
0<s<x;
0<x≤0.5;
0≤u≤0.5;
(x+u)≤0.5;
0≤y≤0.9;
0≤v≤0.9;
0≤(y+v+s)≤0.9;
[u(a"−a)+v(b"−b)−x+s+βy+2δ]=0;
$\delta_{min}$<δ<$\delta_{max}$;
$\delta_{min}$=[u(a−a")+v(b−b")−βy]/2;
$\delta_{max}$=[u(a−a")+v(b−b")−βy+x]/2; and Ma, Ma', Ma", Mb, Mb' and Mb" are as defined above, Mb representing an atom chosen from transition metals capable of existing in several possible valences.

The ceramic material may also be selected from one of the following formulae:
$La_zX_{1-z}FeO_{3-\delta}$ where 0<z<1.0, X is Sr, Ca, or Ba, and δ is such that the formula is such that the electrical neutrality of the crystal lattice is preserved.
$Sm_zX_{1-z}FeO_{3-\delta}$ where 0<z<1.0; X is Sr, Ca, or Ba, and δ is such that the formula is such that the electrical neutrality of the crystal lattice is preserved.
$(Sr(Co_{0.8}Fe_{0.2}))_{1-x}Ti_xO_{3-\delta}$ where x=0, 0.05, 0.1, 0.2, or 0.4, and δ is such that the formula is such that the electrical neutrality of the crystal lattice is preserved.

The ceramic material may also be in admixture with a metal or metal alloy to form a cermet, for example, a mixture of ytttria stabilized zirconia (YSZ) or cerium gadolinium oxide (CGO) with Pt, Pd, a Pd/Ag alloy, a Pd/Au alloy, Ni, Nb, Ta, Nb, or V.

When the hollow composite ceramic fiber is intended for the separation of hydrogen from a hydrogen-containing gas, for the production of hydrogen and carbon dioxide from syngas, or for facilitation of a reductive reaction such as the production of longer-chain hydrocarbons from methane or the dehydrogenation of saturated hydrocarbons, any one of a wide variety of proton-conducting ceramics known in the art may be used in practice of the invention.

A non-limiting list of typical proton-conducting ceramics suitable for use in the invention include: several perovskite-type oxides based on $SrCeO_3$ or $BaCeO_3$, in which some trivalent cations are partially substituted for cerium according to the general formula of $SrCe_{1-x}M_xO_{3-\delta}$ or $BaCe_{1-x}M_xO_{3-\delta}$ where M is some rare earth element, x is less than its upper limit of solid solution formation range (usually less than 0.2) and δ is such that the compound is electrically neutral. Still other non-limiting, more particular examples include $SrCe_{0.95}Yb_{0.05}O_{3-\delta}$ (which is a solid solution based on the perovskite-type oxide SrCeO3, in which 5% of Ce is replaced by Yb); $BaCa_{1.18}Nb_{1.82}O_{3-\delta}$; $BaCe_{0.8}Gd_{0.2}O_{3-\delta}$; $BaCe_{0.90}Y_{0.10}O_{3-\delta}$; $Ce_{0.8}M_{0.2}O_{2-\delta}$ (M=La, Y, Ga, Sm); $Li_2SO_4$; $La_{1.9}Ca_{0.1}Zr_2O_{6.95}$; $SrCe_{0.95}Yb_{0.05}O_{3-\delta}$; $SrZr_{0.90}Yb_{0.1}O_{3-\delta}$; and $SrZr_{0.90}Y_{0.1}O_{3-\delta}$. Other proton-conducting ceramic materials that are suitable include:
$SrCe_zX_{1-z}O_{3-\delta}$ where 0<z<1.0, X is Yb, Sc, Eu, Sm, Ho, Tm, Tb, or Y, and δ is such that the compound is electrically neutral;
$BaCe_zX_{1-z}O_{3-\delta}$ where 0<z<1.0, X is Nd, Ca, La, Y, Yb, Gd, Er, Zr, Zr & Na, Ru, or Y, and δ is such that the compound is electrically neutral;
$SrZr_zX_{1-z}O_{3-\delta}$ where 0<z<1.0, X is Yb, Y, In, Al, Gb, Rh or Y, and δ is such that the compound is electrically neutral;
$CaZr_zIn_{1-z}O_{3-\delta}$ where δ is such that the compound is electrically neutral;
$BaZr_zIn_{1-z}O_{3-\delta}$ where δ is such that the compound is electrically neutral; and
$SrTi_zRu_{1-z}O_{3-\delta}$ where δ is such that the compound is electrically neutral.

As mentioned above, the ceramic material used in the core suspension may be any ceramic compound known in the ceramic fiber or ceramic membrane art. For example, it may be alumina, zirconia, or other ceramic materials, or mixtures of the foregoing. Typically, it is also a mixed oxide conducting material. It may also be any one of the ceramic materials mentioned above for use in the sheath suspension. Additionally, the ceramic materials of the core and sheath suspensions may be chose according to any of the above-described five embodiments or modifications thereof.

In one combination, the ceramic material of the core suspension is $La_{(1-x)}Sr_xFe_{(1-y)}Ga_yO_{3-\delta}$ (such as $La_{0.6}Sr_{0.4}Fe_{0.9}Ga_{0.1}O_{3-\delta}$) and the ceramic material of the sheath suspension is $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$). In another combination, the ceramic material of the core suspension is $La_{(1-x)}Sr_xFe_{(1-y)}Ga_yO_{3-\delta}$ (such as $La_{0.6}Sr_{0.4}Fe_{0.9}Ga_{0.1}O_{3-\delta}$), the ceramic material of the sheath suspension is $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$) and the sheath is formed from a blend of a minority of $La_{(1-x)}Sr_xFe_{(1-y)}Ga_yO_{3-\delta}$ (such as $La_{0.6}Sr_{0.4}Fe_{0.9}Ga_{0.1}O_{3-\delta}$) and a majority of $La_{1-x}Sr_xFe_{1-y}Co_yO_{3-\delta}$ (such as $La_{0.7}Sr_{0.3}Fe_{0.5}Co_{0.2}O_{3-\delta}$ or $La_{0.6}Sr_{0.4}Fe_{0.5}Co_{0.2}O_{3-\delta}$). In yet another combination, the ceramic material of the core suspension is $La_{(1-x)}Sr_xFe_{(1-y)}Ga_yO_{3-\delta}$ (such as $La_{0.6}Sr_{0.4}Fe_{0.9}Ga_{0.1}O_{3-\delta}$), the ceramic material of the sheath suspension is $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$), the core is formed from a blend of a majority of $La_{(1-x)}Sr_xFe_{(1-y)}Ga_yO_{3-\delta}$ (such as $La_{0.6}Sr_{0.4}Fe_{0.9}Ga_{0.1}O_{3-\delta}$) and a minority of $La_{1-x}Sr_xFe_{1-y}Co_yO_{3-\delta}$ (such as $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$), and the sheath is formed from the same blend but with the minority and majority switched.

When the ceramic fiber is heated, a sufficiently large difference in coefficient of thermal expansion between the core and the sheath might cause delamination of the sheath from the core due to greater axial expansion of the core versus the sheath or of the sheath versus the core. This is called delamination. In order to reduce the tendency of the ceramic fiber to exhibit delamination, the sheath and core may be formed from ceramic materials that will result in an approximately identical coefficient of thermal expansion after sintering. Theoretically identical coefficients of thermal expansion may be obtained in the sheath and core by using a same ceramic material in each of the core and the sheath. Similar coefficients of thermal expansion may be obtained in the sheath and core by using a first ceramic material in the core that is chemically similar to the second ceramic material in the sheath. Alternatively, similar coefficients of thermal expansion may be obtained in the sheath and the core by using both the first and second ceramic materials in each of the core and sheath.

Ceramic Compounds—Particle Sizes

At a minimum, the particle sizes of the ceramic material(s) in the core and sheath should be small enough so that plugging of a spinnerette is avoided. Typically, the maximum grain size will not exceed one tenth of the narrowest gap in the spinnerette through which the suspension travels. The particle sizes of the ceramic material(s) of the core and sheath should also be small enough to avoid an unsatisfactory reduction in strength of the sintered fiber caused by the presence of large particles. Finally, smaller particles allow greater loading of the ceramic material in the core and sheath suspensions because their packing volume is smaller than that of larger particles.

Generally speaking, the median particle size of the ceramic material in the core and sheath suspensions should be less than about 4 μm. Large agglomerates and grains in the ceramic particles of the core are typically reduced to less than about 10 μm.

Very fine ceramic particles may be made by various techniques such as by choosing appropriate synthesis conditions and/or by physical size reduction methods well known to those of ordinary skill in the art, such as attrition milling, ball milling, wet-milling, and ultrasonication. When starting from hard agglomerates of a ceramic material, attrition milling may be used. Generally speaking, the best physical size reduction results are achieved when starting with ceramic particles having a generally round shape. This is typically the case for ceramic particles produced by spraying a solution of the ceramic precursor materials in a high temperature flame, for example 1,100° C., produced by an oxy-acetylene burner. A more rounded shape will allow more ceramic particle packing in the green fiber which tends to produce composite ceramic fibers with fewer defects.

Appropriately sized ceramic particles may be calcined in order to remove undesirable substances adsorbed thereupon. Typically, this is performed by subjecting the inorganic particles to a temperature of 650° C. for 2 hours.

Suspensions

The core suspension is typically prepared according to the following steps. The solvent, polymeric binder, and optional additive(s) for a given suspension are mixed in a high speed, high torque, thermal jacketed attrition mill. The ceramic material and pore former are then added in particulate form to the solvent/binder solution and further mixed. The sheath suspension is similarly prepared, except that no pore former is utilized. While sufficient mixing ordinarily will achieve uniform suspension of the binder, particulate ceramic material, and in the case of the core suspension, the pore formers, incorporation of dispersing agent additives such as surfactants and polyelectrolytes also serve to facilitate and maintain uniform suspension. Other optional additives include one or more plasticizers.

Typically, the ceramic content of the sheath suspension ranges from 65 to 85 wt. %, and the polymeric binder content ranges from 8 to 12 wt. %, with the remainder being solvent, plasticizer and/or dispersant. More typically, the second suspension includes 75-80 wt. % of a ceramic material. Typically, the weight ratio of ceramic material to polymer in the sheath suspension ranges from about 7:1 to about 12:1. One of ordinary skill in the art will recognize that the upper concentration limit for ceramic material(s) in the suspension may be empirically determined without excessive experimentation by slightly varying the ceramic content and observing the fiber's ability to stay cohesive while being drawn. The upper limit will ultimately depend upon the specific compositions selected for the polymeric binder and ceramic material.

A maximum ceramic content of the core suspension is in general limited by the degree to which it may be uniformly suspended. Too great an amount of ceramic particles will produce a certain degree of colloidal non-uniformity. The maximum ceramic content in the core suspension is also limited by the amount of pore former present. If a relatively higher pore former content is present, the ceramic content might need to be decreased in order to achieve satisfactory suspension of all the solids (pore former and ceramic particles) to produce the desired homogeneity in the core suspension. Conversely, if a relatively lower pore former content is present, the ceramic content may be increased in the core suspension.

The pore former content comprises 20-60 vol. % of the total amount of solids in the core suspension with the large majority being comprised of the ceramic particles. Thus, when the only solids in the core suspension are ceramic particles and pore formers, the ceramic particles comprise a corresponding 80-40 vol. % of the total amount of solids. We believe that a pore former content of 20 vol. % will ensure that a sufficient minimum degree of porosity will be formed in the green fiber after burn-off and retained after sintering of the ceramic particles. We also believe that a pore former content of 60 vol. % will ensure that the green fiber after burn-off will not become too porous such that it is riddled with defects after sintering of the ceramic particles. In practice, an optimal amount of pore former present in the core suspension may be empirically determined by one of ordinary skill in the art in routine fashion.

Sintering

The dried, washed, wound, solidified fiber (i.e., the "green fiber") may be sintered in processing having two major steps to provide a sintered ceramic fiber.

First, the green fiber is heated under conditions sufficient high to drive off or pyrolize the binder from both the core and sheath and also drive off or pyrolize the pore former from the core but not substantially sinter the ceramic materials in either the core or the sheath. Another term for this is burn-off. One of ordinary skill in the art will recognize that at least some sintering of the ceramic materials may occur at the temperature(s) at which the binder and pore former are burned off. Otherwise, the particles of the ceramic materials would not cohere and the fiber would disintegrate.

Second, the binderless green fiber is heated under conditions sufficient to sinter the particles of ceramic material in the sheath and densify the sheath to render it gas-tight. Because the pores in the sheath are only caused by burn-off of the continuous matrix polymeric binder and not by the discrete particles of insoluble pore former, the pores in the sheath are so less numerous and are of much smaller size. Thus, the pores in the sheath collapse during the second step to yield a nearly void-free sheath.

On the other hand, because the pores in the core are caused by both the burn-off of the continuous matrix polymeric binder and by discrete particles of insoluble pore former, the pores in the core after burn-off are both more numerous and are of larger size in comparison to those of the sheath. As a result, the pores in the core substantially withstand collapse. One of ordinary skill in the art will recognize that fibers of the invention may experience some degree of core pore collapse but not total pore collapse as is experienced in the sheath. Thus, while the core may experience some densification, it is very limited in comparison to that of the sheath. As a result, the pores in the core still interconnect to provide a non-gas-tight core after the second step is performed.

The presence of an interconnecting network of pores in the core and non-gas-tightness and the presence of a densified and gas-tight sheath may be confirmed by sintering fibers made only of the core and fibers made of the sheath/core. A successful showing will yield a non-gas-tight core-only fiber and a gas-tight core/sheath fiber. This confirmation may be buttressed by imaging a suitable cross-section of the inventive fiber with a scanning electron microscope to verify that the core exhibits an interconnecting network of pores while the sheath is densified.

A typical temperature profile for sintering is as follows:
ramping the temperature from room temperature to 400° C. at a rate of 5° C./min;
ramping the temperature from 400° C. to 500° C. at a rate of 1° C./min to initiate burn-off of the polymeric binder and pore former;
dwell time of one hour at 500° C. to ensure complete burn-off;
ramping the temperature from 500° C. at a rate of 5° C./min to the temperature at which the sheath is sintered and densified and the core is sintered but not fully densified; and
dwell time of two hours at the above-reached temperature.

The times, temperatures, and temperature ramp rates in the sintering cycle may be optimized based upon the particular polymeric binder, types of ceramic materials used as well as the particle sizes of the particulate ceramic materials. Thermogravimetric analysis of the organic material may be performed in a manner well known to those skilled in the art to establish the times, temperatures, and temperature ramp rates for the organics burn-off phase of the sintering cycle. Also, generally speaking a relatively small particle size of the ceramic material (and associated high surface area) tends to inhibit removal of the polymeric binder, so in such a case the temperature ramp rates should be relatively lower and the dwell times increased. On the other hand, in the sintering phase, a relatively small particle size (and associated high surface area) will tend to increase the speed of sintering, so the dwell times in such a case should be relatively lower. Dilatometry analysis (also called thermal expansion analysis) of the green fiber may be performed in a manner well known to those skilled in the art to establish, in routine fashion, the times, temperatures, and temperature ramp rates for the sintering phase of the sintering cycle. In such analysis, the size of a piece of the green fiber is recorded as the temperature is raised. The initiation of sintering is indicated when a very fast decrease of the sample size is recorded.

Upon completion of sintering, the sheath, and therefore the fiber, is gas-tight. The term "gas-tight" means that if the interior of the fiber is pressurized, no escape of the pressurization gas from the external circumferential surface of the fiber can be detected. On the other hand, the core has an interconnecting network of pores and is not gas-tight.

Gas Separation Membrane Module

As best illustrated in FIG. 1, a gas separation membrane module is the so-called "double-ender" type with a zoomed-in portion illustrating the gas separation at the fiber level. The module that includes a plurality of sintered hollow ceramic fibers 1 extending between an upstream tubesheet 3 and a downstream tubesheet (not illustrated) disposed adjacent corresponding upstream and downstream ends of a cylindrically shaped housing 5 as is conventionally known in the gas separation membrane field. The housing 5 has an upstream bore-side port 7 formed at one end and downstream bore-side port 9 at the other end. The housing 5 also has a shell-side port 11 extending from the shell side of the housing 5.

In operation, a flow of feed gas 2 is fed to bore-side port 7. It then flows into the fibers 1 via open upstream ends thereof. Inside the bores of the fibers 1, molecular oxygen or hydrogen (as the case may be) in the feed gas flows through the interconnecting network of pores in the core and dissociates into oxygen anions ($O^{2-}$) or into protons and electrons, respectively, at the interface of the core and sheath. The oxygen anions or protons (as the case may be) are transported through the sheath to an outer surface of the sheath where they reform as molecular oxygen or hydrogen, respectively, to form a permeate gas 4. The remaining portion of the feed gas travels down the bores of the fibers 1 and out the open downstream ends thereof to form the non-permeate gas 6. The permeate gas 4 is collected from shell-side port 11 while the non-permeate gas 6 is collected from bore-side port 9.

In an alternative arrangement of the "double-ender" module, the feed gas may instead be fed to shell-side port 11, the non-permeate gas 6 may be collected from another shell-side port (not illustrated) disposed on an opposite end of the housing in between the tubesheets, and the permeate gas 4 may be collected from bore-side port 9. A sweep gas may be introduced into bore-side port 7 to lower the partial pressure of the oxygen or hydrogen accumulating on the inside the fibers 1 in order to increase the flux through the fibers 1. If no sweep gas is desired, either or both of port 7 and port 9 can be utilize to collect the permeate gas 6.

Alternatively, the module may be of the so-called "single-ender" type where only the upstream ends of the fibers 1 are open and the downstream closed ends of the fibers 1 terminate in a space defined by inner surfaces of the housing. In this alternative case, there is no need for a downstream tubesheet or a downstream bore-side port. The feed gas is introduced into an interior of the housing 5 adjacent the closed ends of the fibers 1 via shell-side port 11. In this case, no non-permeate gas need be collected or it can be collected from another shell-side port disposed on an opposite end of the housing 5. The permeate gas is collected from the bore-side port 7.

The so-called "single-ender" type of module may be used as an oxidative or reductive reactor whereby a feed gas of oxygen or hydrogen is reacted with another reactant such as a hydrocarbon fuel (i.e., methane) or unsaturated hydrocarbons (i.e., alkenes or alkynes). In this case, the feed gas is an oxygen or hydrogen containing gas (as the case may be). The feed gas is the first reactant. The second reactant is introduced into the bore-side port 7. The first and second reactants react on the inner surface of the core to form reaction products. A flow of reaction product is then collected from bore-side port 9.

EXAMPLES

Three monolithic fibers were spun under identical conditions using the conventional polymer phase inversion fiber spinning technique from suspensions including particles of $La_{0.7}Sr_{0.3}Co_{0.2}Fe_{0.8}O_{3-\delta}$, Estane 5708 binder, and NMP solvent. The spin dope suspensions for two of the fibers also included polyethylene pore former having an average particle size of 10 μm. The remaining fiber did not include pore former. The green fibers were sintered under identical conditions and evaluated for gas-tightness. The suspensions from which they were spun are listed in Table 1 below.

TABLE 1

Suspension Compositions

| Example | Component | weight % | volume % | volume % (solids) |
|---|---|---|---|---|
| I | $La_{0.7}Sr_{0.3}Co_{0.2}Fe_{0.8}O_{3-\delta}$ | 68.5 | 30.3 | 59.5 |
|  | polyethylene | 5 | 20.6 | 40.5 |
|  | Estane 5708 | 9.3 | 11.1 |  |
|  | NMP | 17.1 | 37.9 |  |
| II | $La_{0.7}Sr_{0.3}Co_{0.2}Fe_{0.8}O_{3-\delta}$ | 75 | 37.5 | 83.3 |
|  | Polyethylene | 3 | 7.5 | 16.7 |
|  | Estane 5708 | 8 | 20 |  |
|  | NMP | 14 | 35 |  |
| III | $La_{0.7}Sr_{0.3}Co_{0.2}Fe_{0.8}O_{3-\delta}$ | 82 | 47.7 | 100.0 |
|  | Estane 5708 | 8.4 | 27.9 |  |
|  | NMP | 9.6 | 24.4 |  |

The fiber produced according to Examples II and III were gas-tight, while the fiber produced according to Example I was not. The comparative testing illustrates that a minimum amount of pore formers in the suspension will result in a porous and non-gas-tight fiber while a suspension without pore formers will result in a gas-tight fiber.

Figure 2:
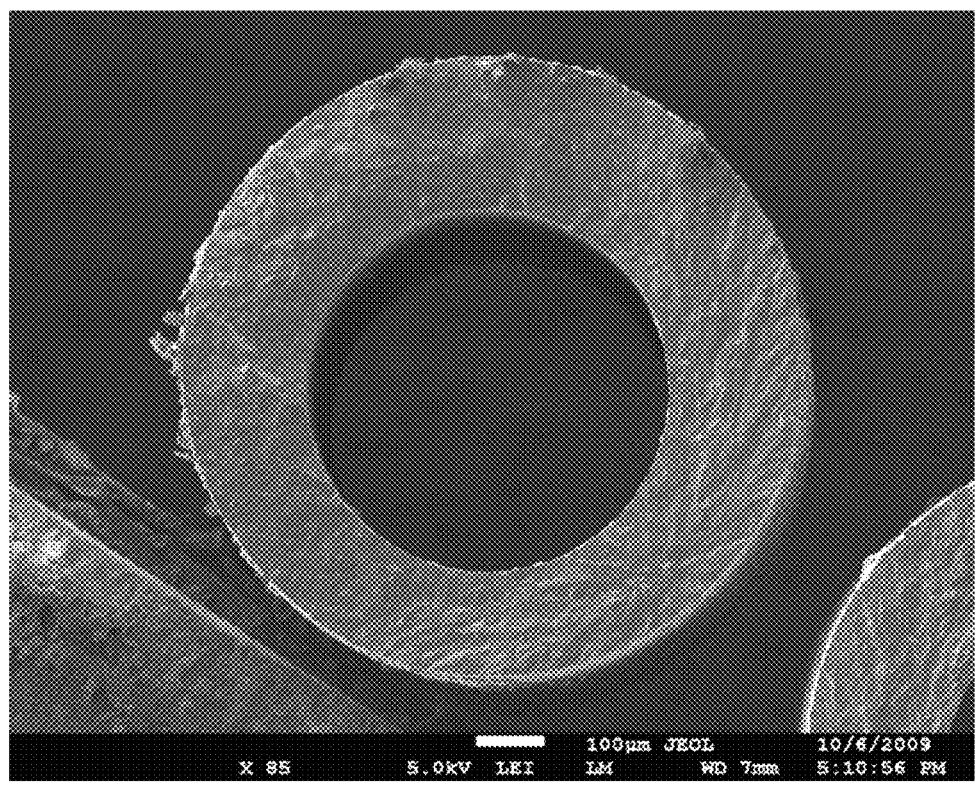
FIG. 2 is a microphotograph of a cross-section of a fiber produced from a suspension not including pore formers.
Figure 3:
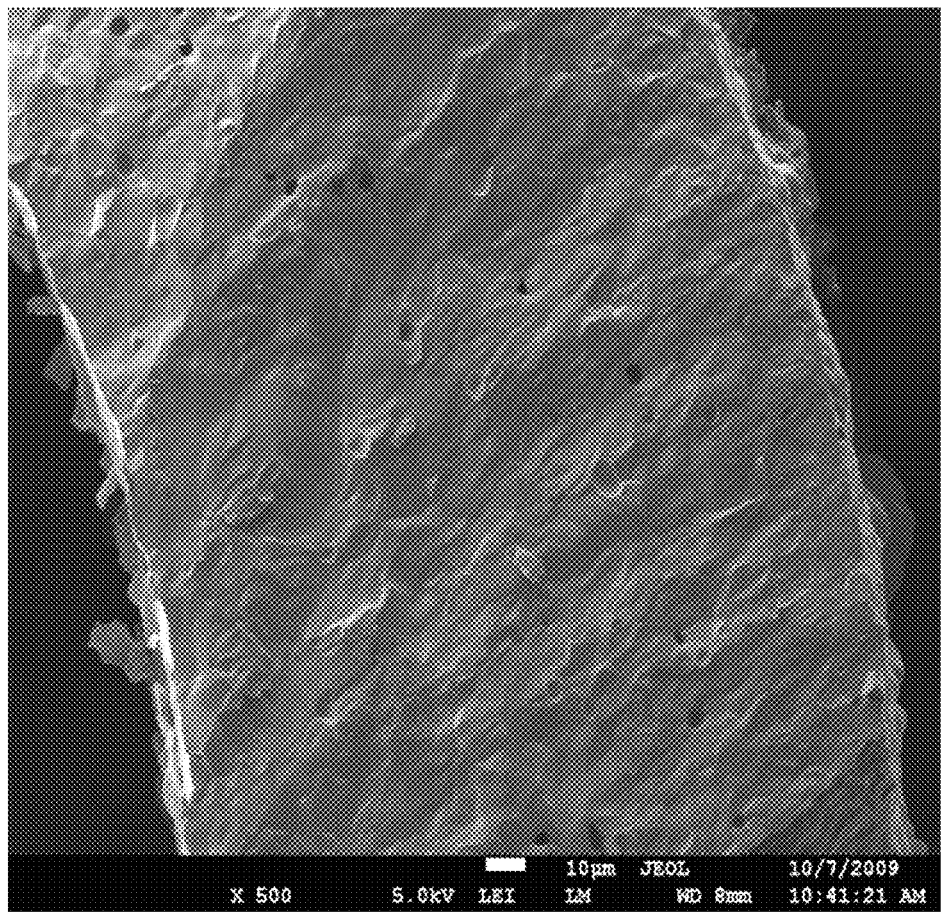
FIG. 3 is a zoomed microphotograph of a cross-section of the fiber of FIG. 2.
Figure 4:
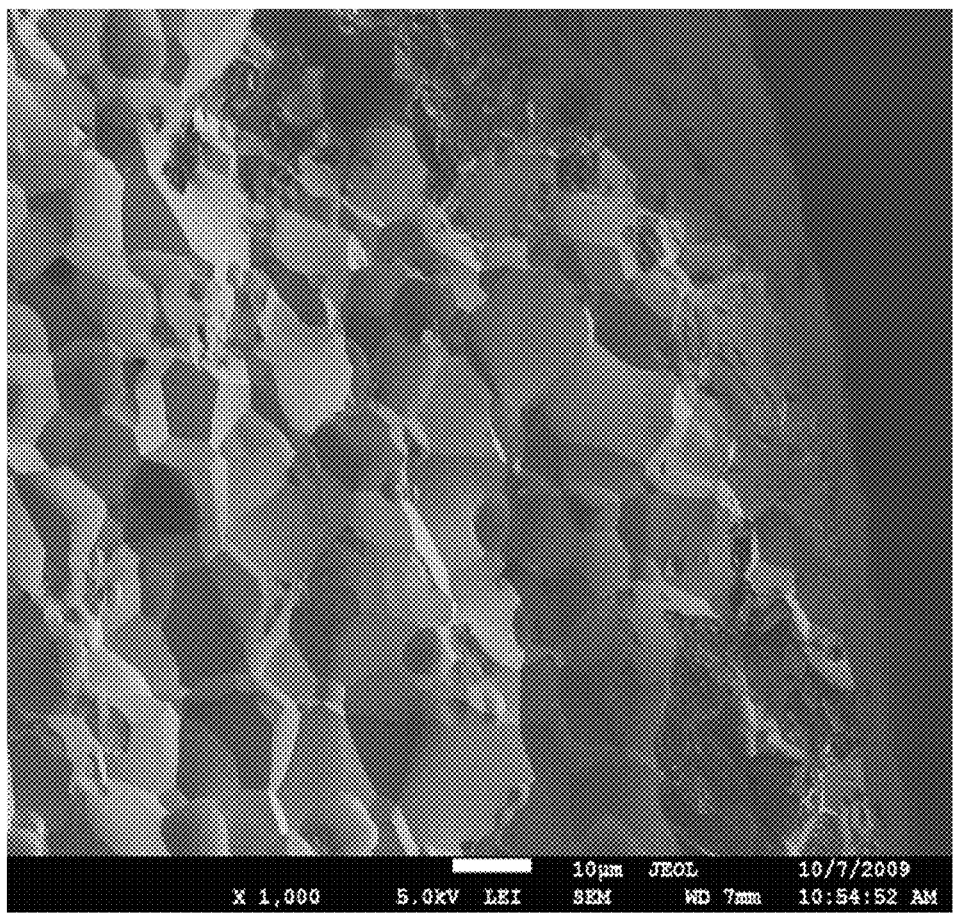
FIG. 4 is an even more zoomed microphotograph of a cross-section of the fiber of FIG. 2.
Figure 5:
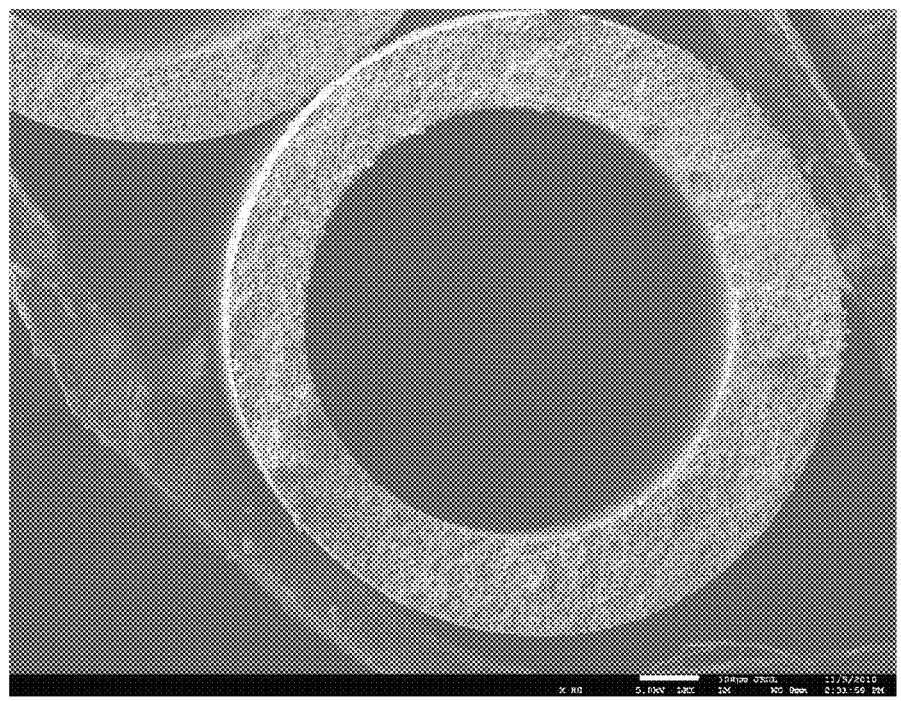
FIG. 5 is a microphotograph of a cross-section of a fiber produced from a suspension that does include pore formers.
Figure 6:
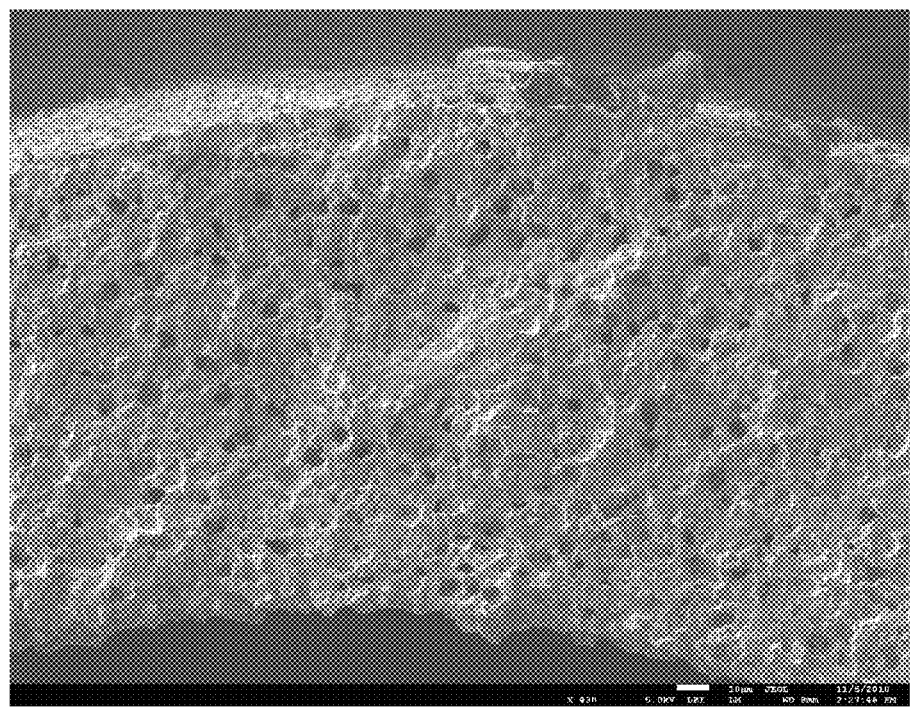
FIG. 6 is a zoomed microphotograph of a cross-section of the fiber of FIG. 5.

Images were taken of cross-sections of the fibers of Examples I and III. As shown in FIGS. 2-4, the gas-tight fiber of Example III has very little porosity. As shown in FIGS. 5-6, the non-gas-tight fiber of Example I has an interconnecting network of pores.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A process for making a composite hollow fiber, comprising the steps of:
preparing a core suspension comprising a first polymeric binder, a first particulate ceramic material, a first solvent, and a pore former material;
preparing a sheath suspension comprising a second polymeric binder, a second particulate ceramic material, and a second solvent;
providing a spinnerette adapted and configured to continuously extrude one or more nascent hollow fibers comprising a hollow core formed from the core suspension and a sheath surrounding the core formed from the sheath suspension;
immersing the nascent hollow fiber in a liquid coagulant to facilitate phase inversion of the first and second polymeric binders; and
withdrawing the coagulated fiber from the liquid coagulant, wherein:
the pore former material is not present in the sheath suspension;
the pore former material is insoluble in the first and second solvents;
the second particulate ceramic material comprises a mixed oxide conductor;
the first and second particulate ceramic materials are chemically identical or different;
the first and second solvents are the same or different; and
the first and second polymeric binders are the same or different.

2. The process of claim 1, wherein the pore former material has a median particle size of no greater than 20% of a wall thickness of the coagulated fiber.

3. The process of claim 1, wherein the pore former has a median particle size no less than 150% of a median particle size of the first ceramic material.

4. The process of claim 1, wherein the first and second particulate ceramic materials are chemically identical.

5. The process of claim 1, wherein the core suspension further comprises an amount of the second particulate ceramic material.

6. The process of claim 1, wherein:
the sheath suspension further comprises an amount of the first particulate ceramic material.

7. The process of claim 1, wherein:
the core suspension further comprises an amount of the second particulate ceramic material; and
the sheath suspension further comprises an amount of the first particulate ceramic material.

8. The process of claim 1, further comprising the step of passing the nascent hollow fiber from the spinnerette through an air gap.

9. The process of claim 1, wherein the mixed oxide conductor comprises a hydrogen conducting mixed oxide conductor.

10. The process of claim 1, wherein the mixed oxide conductor is an oxygen conducting mixed oxide conductor.

11. The process of claim 10, wherein the oxygen conducting mixed oxide conductor is a perovskite independently selected from formula (I):

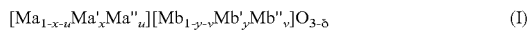

$[Ma_{1-x-u}Ma'_xMa''_u][Mb_{1-y-v}Mb'_yMb''_v]O_{3-\delta}$    (I)

in which:
- Ma represents an atom chosen from scandium, yttrium, or from the families of lanthanides, actinides or alkaline-earth metals;
- Ma', which is different from Ma, represents an atom chosen from scandium, yttrium or from the families of lanthanides, actinides or alkaline-earth metals;
- Ma", which is different from Ma and Ma', represents an atom chosen from aluminum (Al), gallium (Ga), indium (In), thallium (Tl) or from the family of alkaline-earth metals;
- Mb represents an atom chosen from transition metals;
- Mb', which is different from Mb, represents an atom chosen from transition metals, aluminum (Al), indium (In), gallium (Ga), germanium (Ge), antimony (Sb), bismuth (Bi), tin (Sn), lead (Pb) and titanium (Ti);
- Mb", which is different from Mb and Mb', represents an atom chosen from transition metals, alkaline-earth metals, aluminum (Al), indium (In), gallium (Ga), germanium (Ge), antimony (Sb), bismuth (Bi), tin (Sn), lead (Pb) and titanium (Ti);
- $0 < x \le 0.5$;
- $0 \le u \le 0.5$;
- $(x+u) \le 0.5$;
- $0 \le y \le 0.9$;
- $0 \le v \le 0.9$;
- $0 \le (y+v) \le 0.9$; and
- $\delta$ is such that the structure in question is electrically neutral.

12. The process of claim 11, wherein the second particulate ceramic material is $La_{1-x}Sr_xFe_{1-y}Co_yO_{3-\delta}$.

13. The process of claim 12, wherein the second particulate ceramic material is $La_{0.7}Sr_{0.3}Fe_{0.8}Co_{0.2}O_{3-\delta}$ or $La_{0.6}Sr_{0.4}Fe_{0.8}Co_{0.2}O_{3-\delta}$.

14. The process of claim 1, wherein the pore former has a median particle size of 5 to 50 μm.

15. The process of claim 1, wherein the composite hollow fiber has an outer diameter of 150-6,000 μm, an inner diameter of 50-2,000 μm, a core thickness of 50-2,000 μm, and a sheath thickness of 3-70 μm.

16. The process of claim 15, wherein the composite hollow fiber has an outer diameter of 1,300-2,850 μm and a combined core and sheath thickness of 260-1,000 μm.

17. the process of claim 1, where the pore former is present in the core suspension in an amount comprising 20-60 vol. % out of the total amount of solids in the core suspension.

18. A composite hollow fiber produced by the method of claim 1.

19. A method of making a composite hollow ceramic fiber, comprising the steps of:
- heating the composite hollow fiber of claim 18 under conditions sufficient to drive off the first and second polymeric binders; and
- heating the binderless composite hollow fiber under conditions sufficient to sinter the core and sheath and densify the sheath to gas-tightness but not fully sinter the core.

20. A composite hollow ceramic fiber produced by the method of claim 19.

21. The composite hollow ceramic fiber of claim 20, wherein an outside diameter of the composite hollow ceramic fiber is in a range from about 900 to 2,000 μm and a ratio of the outside diameter of the composite hollow ceramic fiber to an inside diameter of the composite hollow ceramic fiber is in a range of from about 1.20:1.0 to about 3.0:1.0.

22. The composite hollow ceramic fiber of claim 20, wherein the core has an interconnecting network of pores.

23. The process of claim 1, wherein the only suspensions extruded from the spinnerette are the core and sheath suspensions.

* * * * *